(12) United States Patent  (10) Patent No.: US 7,921,128 B2
Hamilton, II et al.  (45) Date of Patent: Apr. 5, 2011

(54) METHOD AND SYSTEM FOR MERGING DISPARATE VIRTUAL UNIVERSES ENTITIES

(75) Inventors: Rick Allen Hamilton, II, Charlottesville, VA (US); Steven Mark Harrison, Bremerton, WA (US); Brian Marshall O'Connell, Cary, NC (US); Clifford Alan Pickover, Yorktown Heights, NY (US); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/026,045

(22) Filed: Feb. 5, 2008

(65) Prior Publication Data

US 2009/0198664 A1  Aug. 6, 2009

(51) Int. Cl.
*G06F 17/30* (2006.01)
(52) U.S. Cl. ......... 707/758; 707/769; 707/912; 715/706
(58) Field of Classification Search .............. 707/758, 707/769, 912; 715/706
See application file for complete search history.

(56) References Cited

U.S. PATENT DOCUMENTS

| | | | |
|---|---|---|---|
| 5,608,850 A | 3/1997 | Robertson | |
| 6,263,363 B1 | 7/2001 | Rosenblatt | |
| 6,342,907 B1 | 1/2002 | Petty et al. | |
| 6,532,474 B2 | 3/2003 | Iwamoto et al. | |
| 6,806,890 B2 | 10/2004 | Audleman et al. | |
| 6,944,821 B1 | 9/2005 | Bates et al. | |
| 7,015,954 B1 | 3/2006 | Foote et al. | |
| 7,031,951 B2 | 4/2006 | Mancisidor et al. | |
| 7,080,161 B2 | 7/2006 | Leddy et al. | |
| 7,082,436 B1 | 7/2006 | Bayiates | |
| 7,099,745 B2 | 8/2006 | Ebert | |
| 7,148,892 B2 | 12/2006 | Robertson et al. | |
| 7,216,290 B2 | 5/2007 | Goldstein et al. | |
| 7,269,632 B2 * | 9/2007 | Edeker et al. ................. | 709/217 |
| 7,298,378 B1 | 11/2007 | Hagenbuch et al. | |
| 2002/0026645 A1 | 2/2002 | Son et al. | |
| 2003/0191841 A1 | 10/2003 | DeFerranti et al. | |
| 2004/0143852 A1 | 7/2004 | Meyers | |
| 2005/0008240 A1 | 1/2005 | Banerji et al. | |
| 2005/0137015 A1 | 6/2005 | Rogers et al. | |
| 2005/0138042 A1 | 6/2005 | Foo et al. | |
| 2006/0031578 A1 | 2/2006 | Pelletier | |
| 2006/0155667 A1 | 7/2006 | Tolba | |
| 2006/0287106 A1 | 12/2006 | Jensen | |
| 2007/0293319 A1 | 12/2007 | Stamper et al. | |
| 2007/0294171 A1 | 12/2007 | Sprunk | |

OTHER PUBLICATIONS

Linden Research, Inc., "Second Life", copyright 2007, <http://web.archive.org/web/20071231233917/http://secondlife.com/>.*
Erin Jennings, "A Basic Guide to Second Life", copyright 2007, The University of Texas at Dallas School of Management, pp. 1-18.*

(Continued)

*Primary Examiner* — Hung Q Pham
(74) *Attorney, Agent, or Firm* — David A. Mims; Robert C. Rolnik

(57) ABSTRACT

A migration tool for merging disparate virtual universes by selecting a source region or source account, selecting a destination edge or destination account, retrieving and storing virtual universe information for the source region or account, inserting the virtual universe resources of the source region or account into the destination region or account, activating the inserted resources, and deleting the source resources from the source region or account.

10 Claims, 16 Drawing Sheets

OTHER PUBLICATIONS

Kawulok, L.; Trusted Group Membership for JXTA; Article; V3938; May 12, 2004; 218-225; Springer-Verlag; Berlin/Heidelberg, Germany.

Collins, J.; Final Office Action; Dec. 22, 2009; U.S. Appl. No. 11/833,426; USPTO.

Business Week, My Virutal Life, magazine, downloaded from http://www.businessweek.com/print/magazine/content/06_18/b39820 on/Sep. 17, 2007.

Qarchive, "Stitching", downloaded from http://stitching.qarchive.org on Nov. 19, 2007.

Brain, "How ASP's Work", How Stuff Works, downloaded from http://computer.howstuffworks.com/asp.htm/printable on Sep. 17, 2007.

IBM, "Grid Explained," downloaded from ftp://ftp.software.ibm.com/common/ssi/rep_wh/n/GRW00900USEN/GRW00900USEN.pdf on Sep. 17, 2007.

Collins, J. L..; Non-Final Office Action; Aug. 11, 2009; U.S. Appl. No. 11/833,426; USPTO.

Fosner; OpenGL Programming for Windows 95 and Windows NT; Oct. 1996; Addison-Wesley.

Muller et al., Rokkatan: Scaling an RTS Game Design to the Massively Multiplayer Realm, vol. 4 No. 3, Jul. 2006, ACM Computers in Entertainment.

Wikipedia; Machine Readable; Internet website; Aug. 30, 2007 (page last modified date); http://en.wikipedia.org/wiki/machine_readable.

McKenna; How Virtual Computing Works; Internet website; Sep. 17, 2007 (page downloaded date); http//:www.howstuffworks.how-virtual-computing-works.

Wikipedia; Machine-readable Medium; Internet website; Jun. 14, 2006 (page last modified date); http://en.wikipedia.org/wiki/Machine-readable-medium.

Brain; How Web Servers Work; Internet website; Sep. 17, 2007 (page download date); http://www.howstuffworks.com/web-server.htm/printable.

Vu, Thanh T; Non-Final Office Action; Dated: Oct. 26, 2010; U.S. Appl. No. 11/936,900; USPTO.

Collins, Joshua L; Examiner's Answer to Appeal Brief; Dated Sep. 17, 2010; U.S. Appl. No. 11/833,426; USPTO.

* cited by examiner

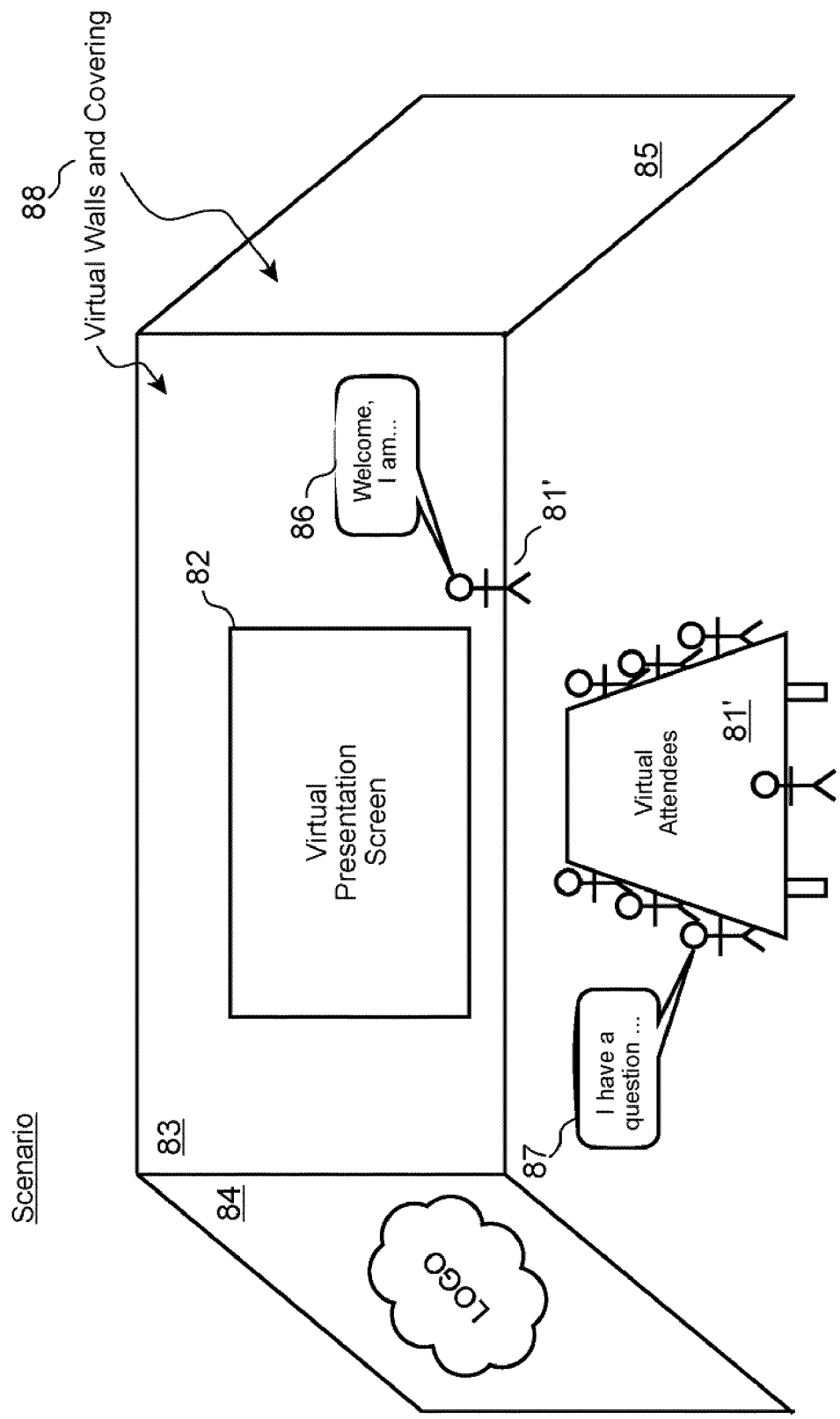

METHOD AND SYSTEM FOR MERGING DISPARATE VIRTUAL UNIVERSES ENTITIES

BACKGROUND OF THE INVENTION

1. Field of the Invention

The present invention relates generally to cross-platform scheduling technologies for "Virtual World" systems, Massively Multiplayer Online Role Playing systems, and the like.

2. Background of the Invention

Whereas the determination of a publication, technology, or product as prior art relative to the present invention requires analysis of certain dates and events not disclosed herein, no statements made within this Background of the Invention shall constitute an admission by the Applicants of prior art unless the term "Prior Art" is specifically stated. Otherwise, all statements provided within this Background section are "other information" related to or useful for understanding the invention.

"Virtual Worlds", also sometimes referred to as "Massively Multi-Player Online Role Playing Games" ("MMPorg") systems, are well known in the art for their ability to allow users, or "players", to assume a virtual identity, and to interact through that identity with the system's logic as well as with other users or players through their own virtual identities. Some of the presently available Virtual World systems and products include, but are not limited to, Second Life™, MindArk PE AB's Intropia™, and Makena Technologies' There<dot>com™, where <dot> represents the period or dot character ".".

By configuring the virtual identity, a user is enabled to create a persona of his or her liking, and to interact within the virtual world and the other users, who are also represented by their own virtual avatars and identities. Most Virtual Worlds allow the user to select or create a three-dimensional representation of his or her virtual identity, referred to as an avatar. Avatars can be realistic in their appearance, or can be a fantasy creature. Other characteristics, such as movement speed and restrictions, communications abilities, and interaction limitations or abilities, can be defined for a user's virtual identity.

While these types of virtual worlds began as gaming and role playing products, they have now evolved into useful platforms for other purposes. One such purpose is an evolution of online meetings, online conferences, and online training or education.

Previous products directed towards these purposes were based on presenting the real voice and/or real image of each "attendee" to an online meeting, either through sharing of still photos of each attendee, or through use of webcams to transmit live images. Communications were enabled through simultaneous use of telephone lines, or through use of voice-over-Internet-Protocol ("VoIP") and/or text messaging.

While these systems offer many advantages, such as saving travel costs, allowing quicker dissemination of information, and fostering near-face-to-face relationships, one draw back of such online meetings is that there is little or no sensation of community during the online conference—each attendee still feels as if he or she is using a computer alone to converse with the other attendees.

With the evolution of Virtual World's into this manner of usage, many of these issues are resolved because there is a greater sense of community or social interaction as the experience is much more complete and realistic. Each attendee feels much more immersed in the meeting virtual environment, including the virtual meeting room or space, and each attendee has a greater sensation of the other attendees' presence because each attendee has a virtual position within the group of attendees, which cannot be had from a standard web meeting.

Further, the facilities issue is alleviated through hosting meetings, training, and conferences in Virtual World's. Rather than renting expensive meeting facilities, and providing expensive real display fixtures and furniture, a company can configure a virtual meeting in a virtual world which has all of the "appearance" factors as desired at a fraction of the costs of a corresponding real-world meeting space. Even better, the virtual meeting space can be reconfigured as needed, such as expanding the space when a larger-than-expected attendee group "signs up" to attend.

Since many original virtual worlds did not restrict where players could "go" within the world, except for restrictions placed on certain levels or privileges for each player, in order to host business-to-business functions, some modifications to the virtual world systems were made.

Chief among these modifications were definitions and controls put in place to allow definition of "private virtual worlds", where one or more users could control which other users could "enter" the private virtual world. This allows a company such as IBM to create multiple private virtual worlds within a virtual world system, such as Second Life, for the purposes of employee training, customer meetings, etc., without the concern for third-parties accessing sensitive or confidential information.

SUMMARY OF THE INVENTION

The present invention provides migration tool for merging disparate virtual universes by selecting a source region or source account, selecting a destination edge or destination account, retrieving and storing virtual universe information for the source region or account, inserting the virtual universe resources of the source region or account into the destination region or account, activating the inserted resources, and deleting the source resources from the source region or account.

BRIEF DESCRIPTION OF THE DRAWINGS

The following detailed description when taken in conjunction with the figures presented herein provide a complete disclosure of the invention.

FIG. 8 illustrates a hypothetical three-dimensional view of a "world" scenario in which a virtual meeting, presentation, or conference is being held.

DETAILED DESCRIPTIONS OF EXEMPLARY EMBODIMENTS OF THE INVENTION

The inventors of the present invention have recognized and solved problems previously unrecognized by others in the art of managing virtual world resources, especially in the context of merging a first virtual world into two or more disparate and separate virtual worlds to form a single, combined virtual world.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
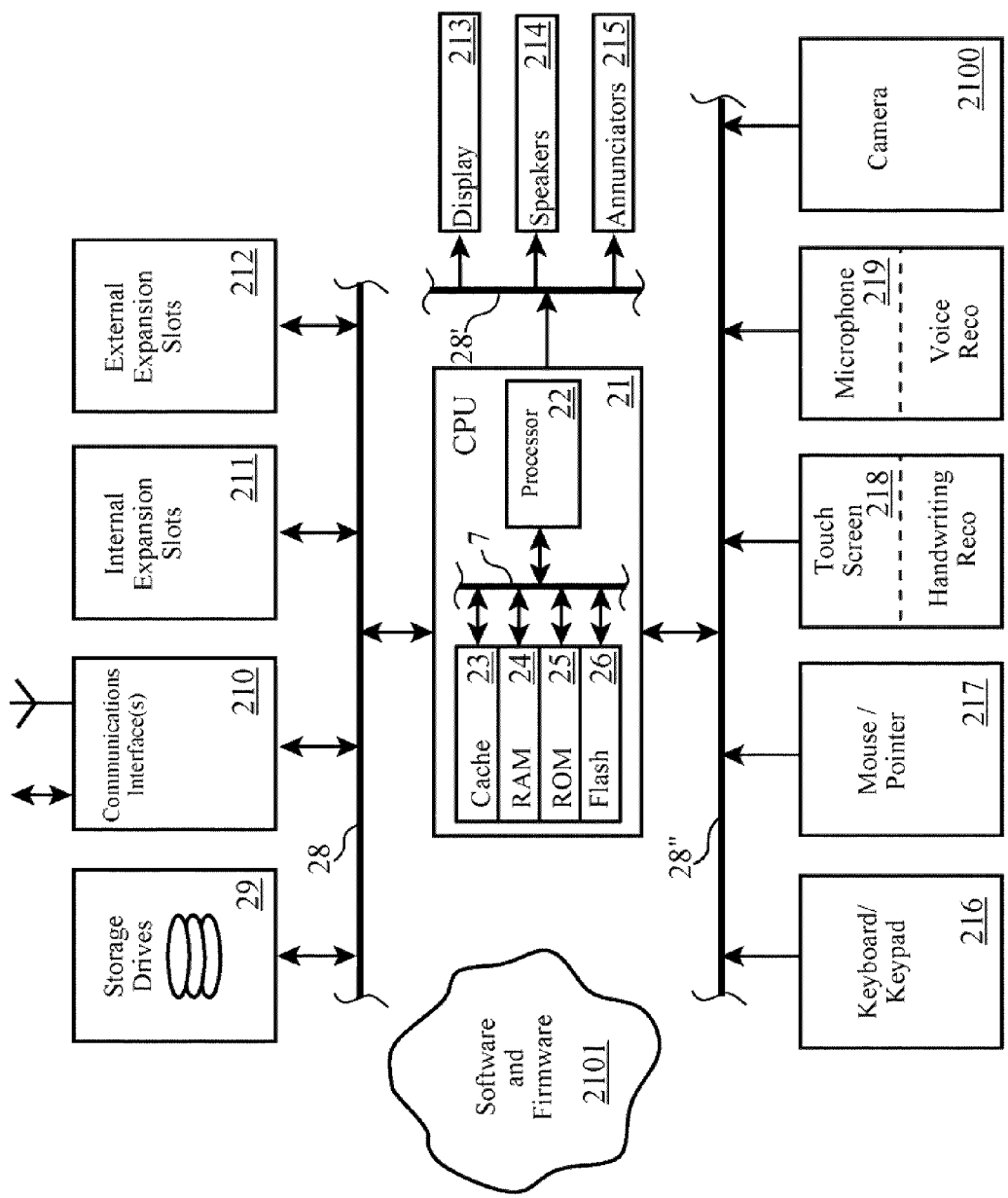
FIGS. 2a and 2b show a generalized computing platform architecture, and a generalized organization of software and firmware of such a computing platform architecture.

Turning to FIG. 2*a*, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
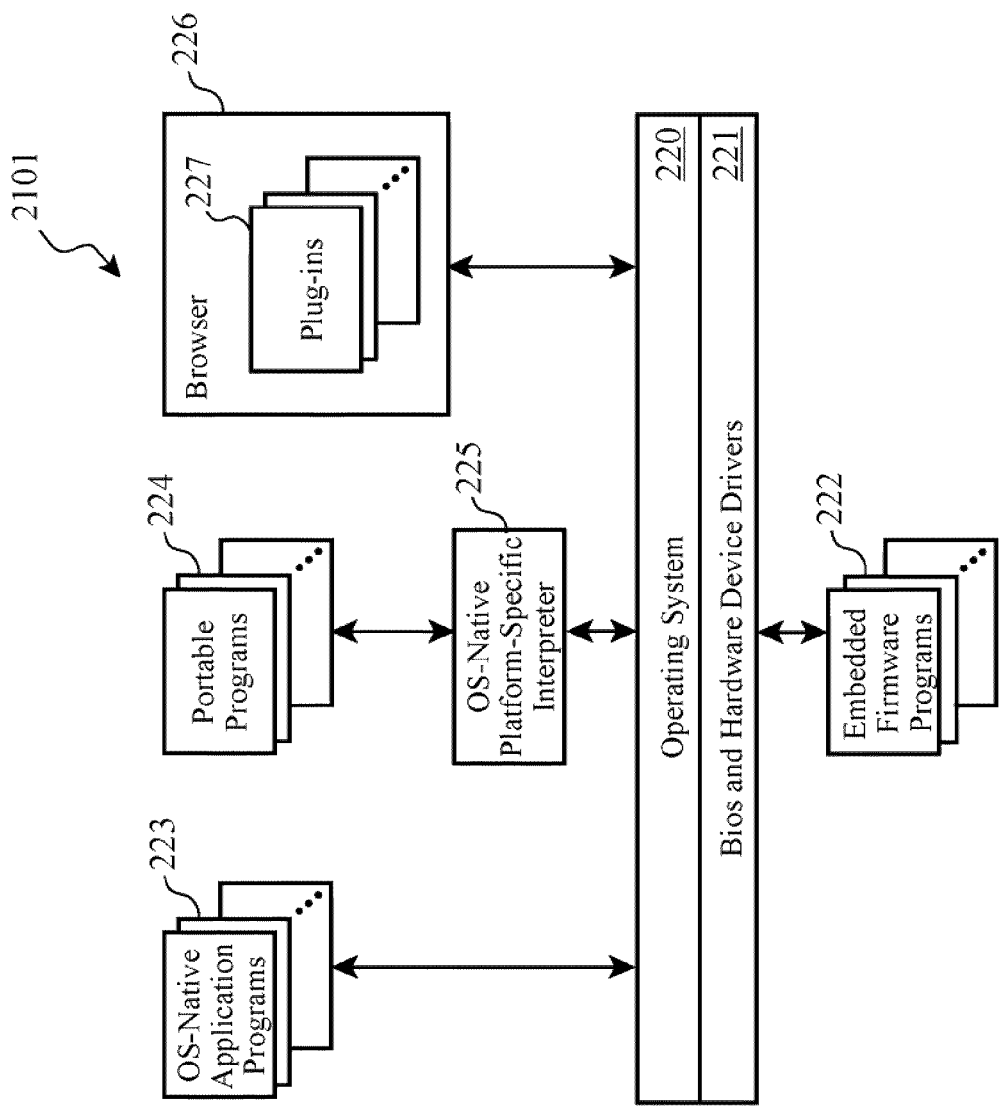
Figure 3A:
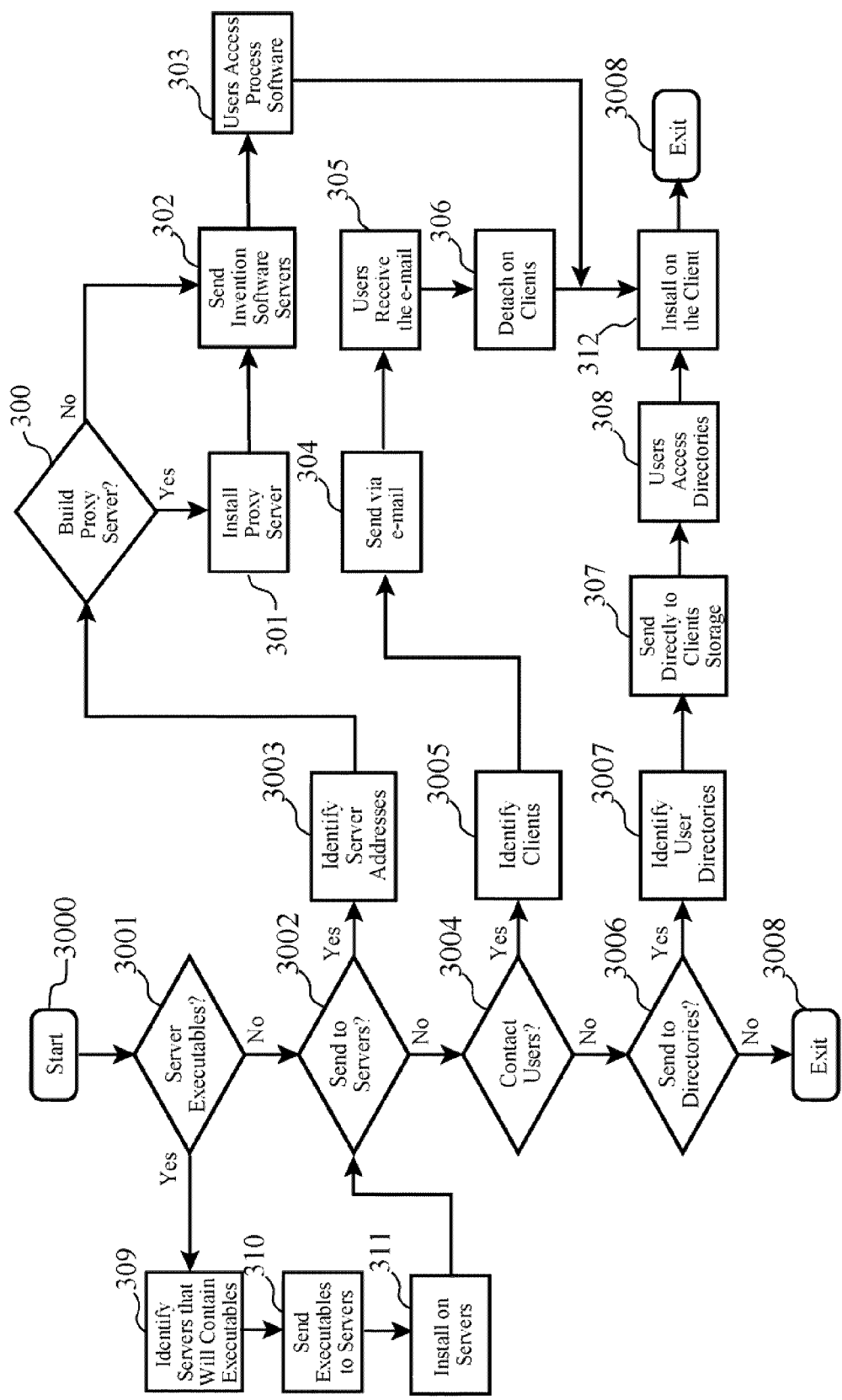
FIG. 3a sets forth a logical process to deploy software to a client in which the deployed software embodies the methods and processes of the present and related inventions.
Figure 3B:
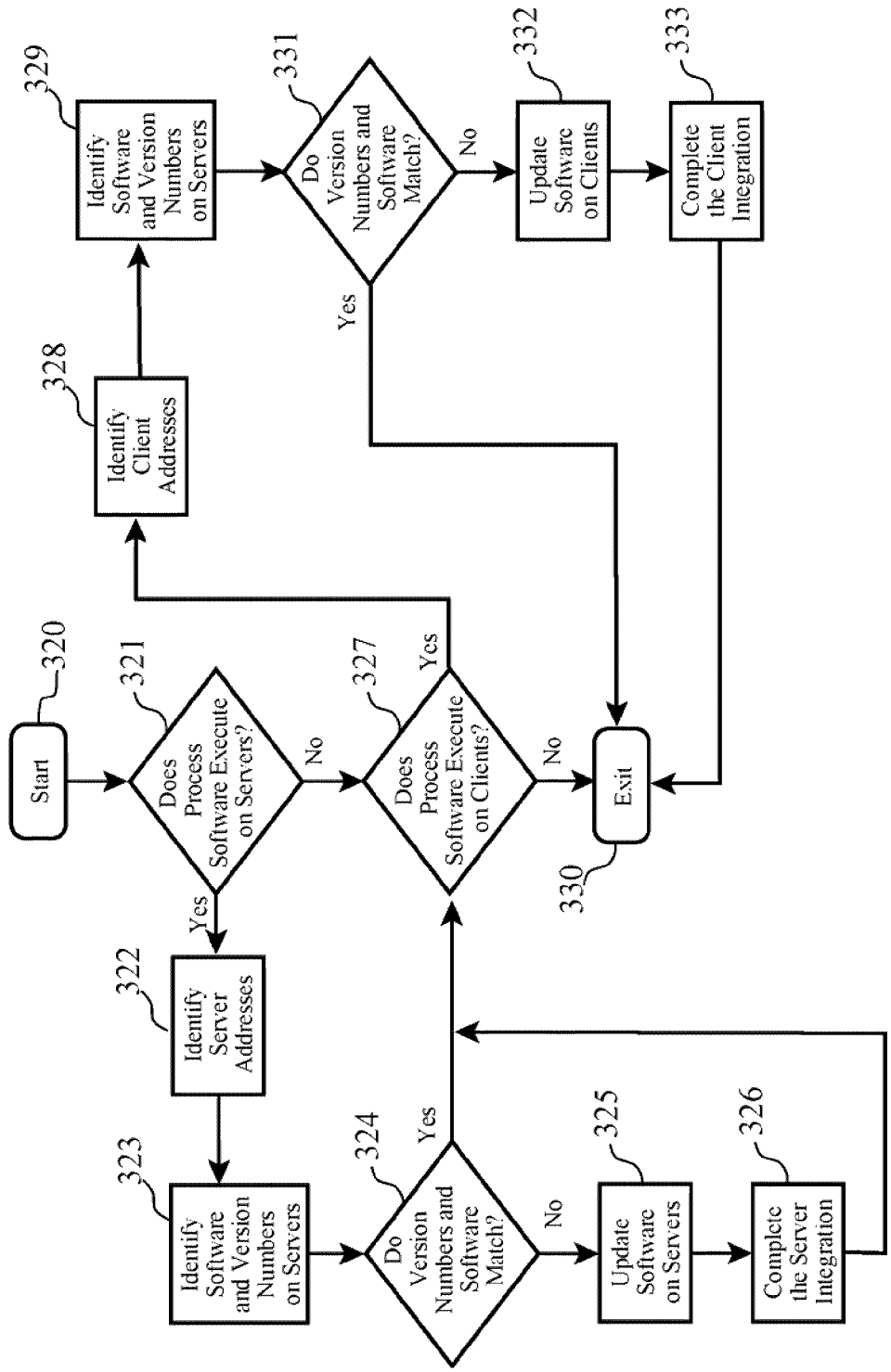
FIG. 3b sets forth a logical process to integrate software to other software programs in which the integrated software embodies the methods and processes of the present and related inventions.
Figure 3C:
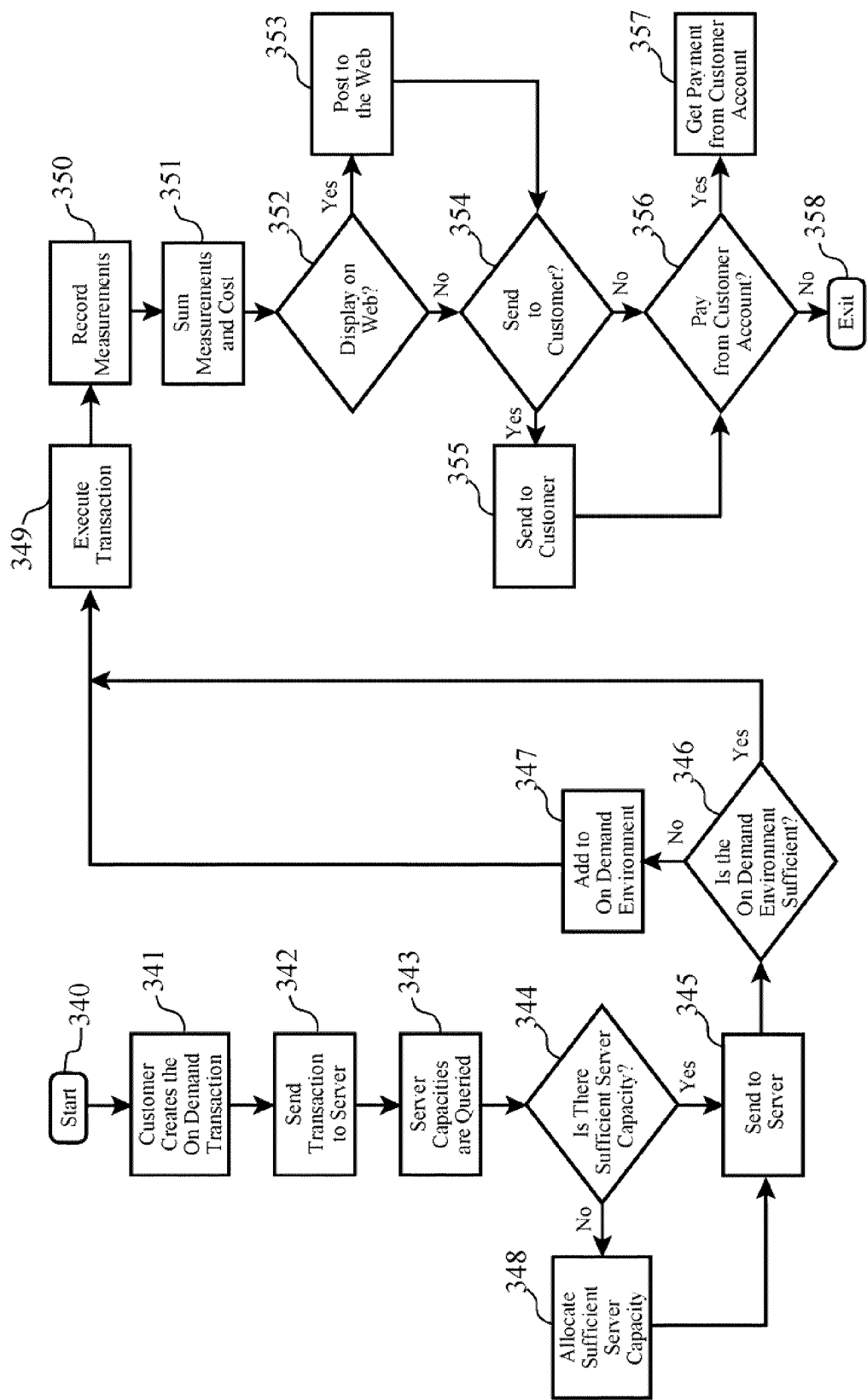
FIG. 3c sets forth a logical process to execute software on behalf of a client in an on-demand computing system, in which the executed software embodies the methods and processes of the present and related inventions.
Figure 3D:
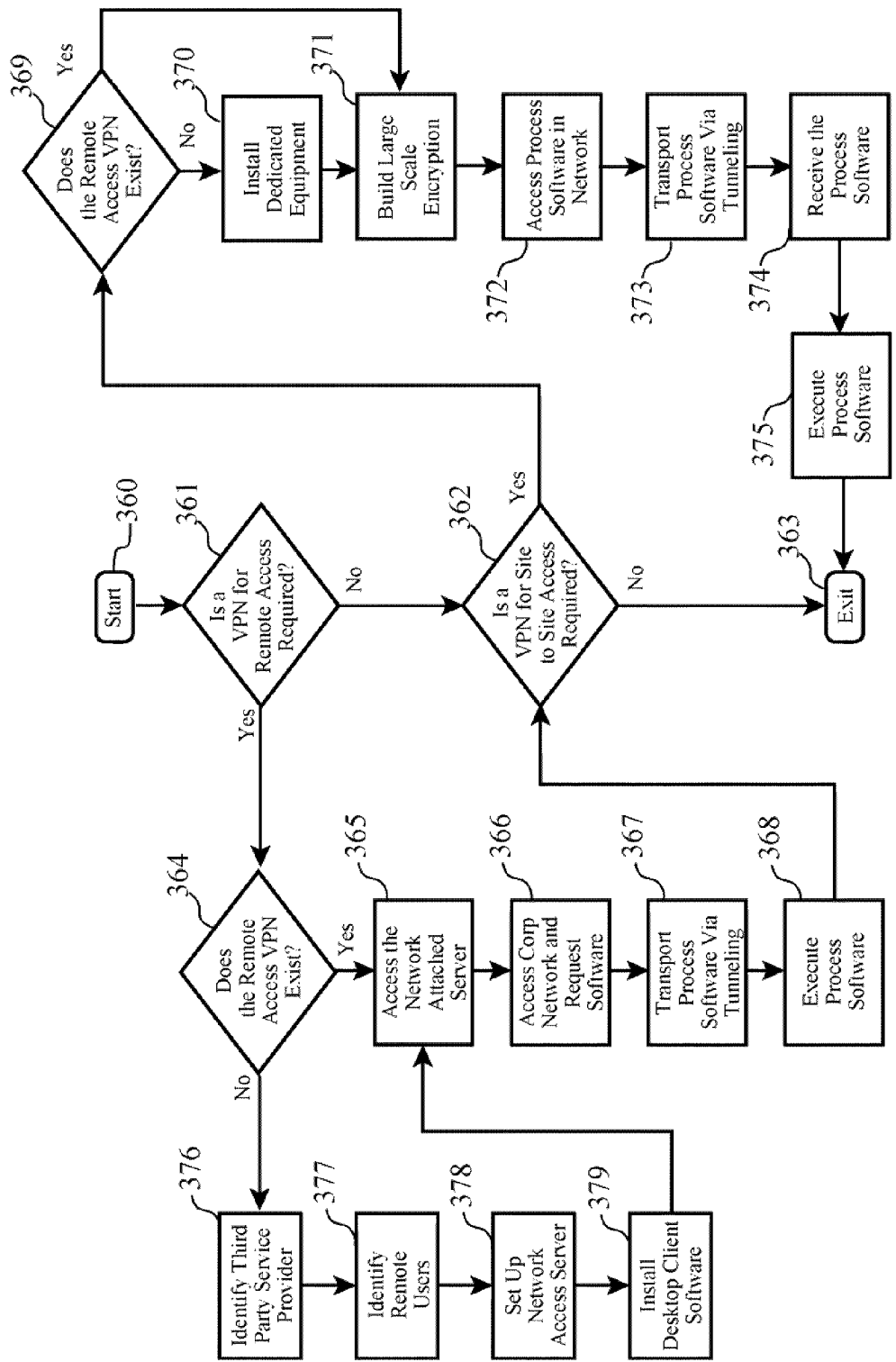
FIG. 3d sets forth a logical process to deploy software to a client via a virtual private network, in which the deployed software embodies the methods and processes of the present and related inventions.

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
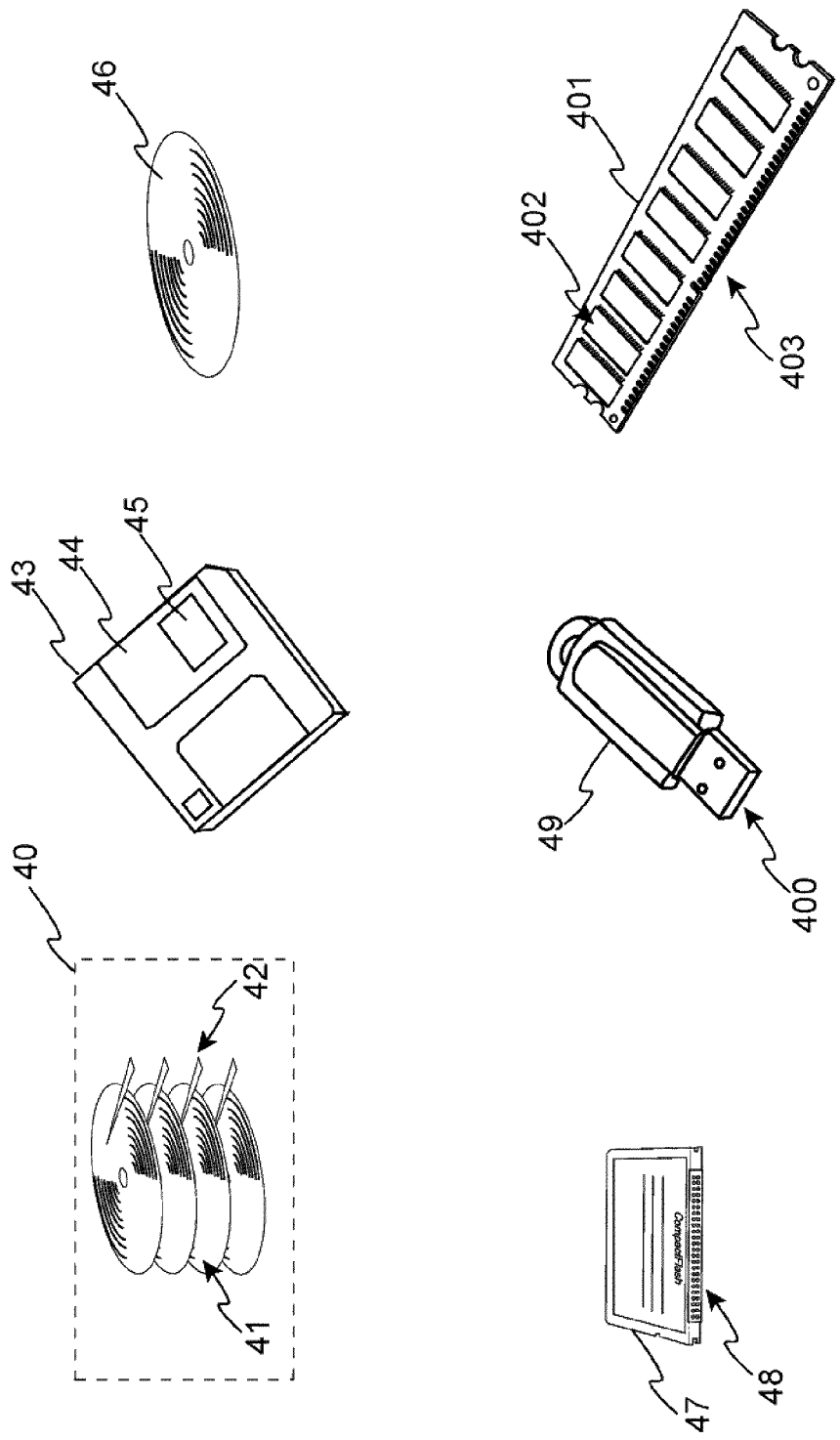
FIGS. 4a, 4b and 4c, illustrate computer readable media of various removable and fixed types, signal transceivers, and parallel-to-serial-to-parallel signal circuits.

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF") (47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
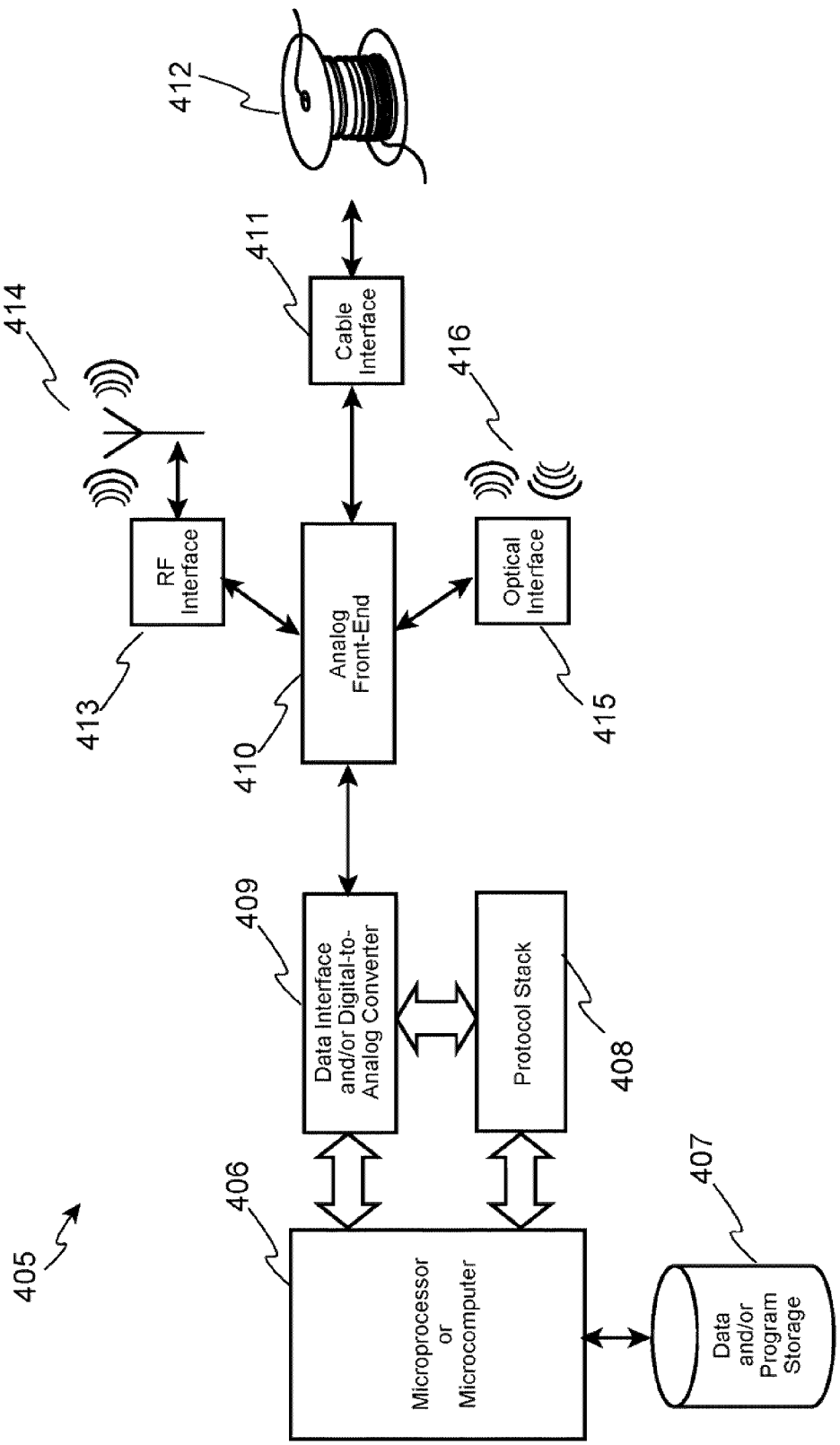

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB Flash-Drive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electromagnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

Figure 4C:
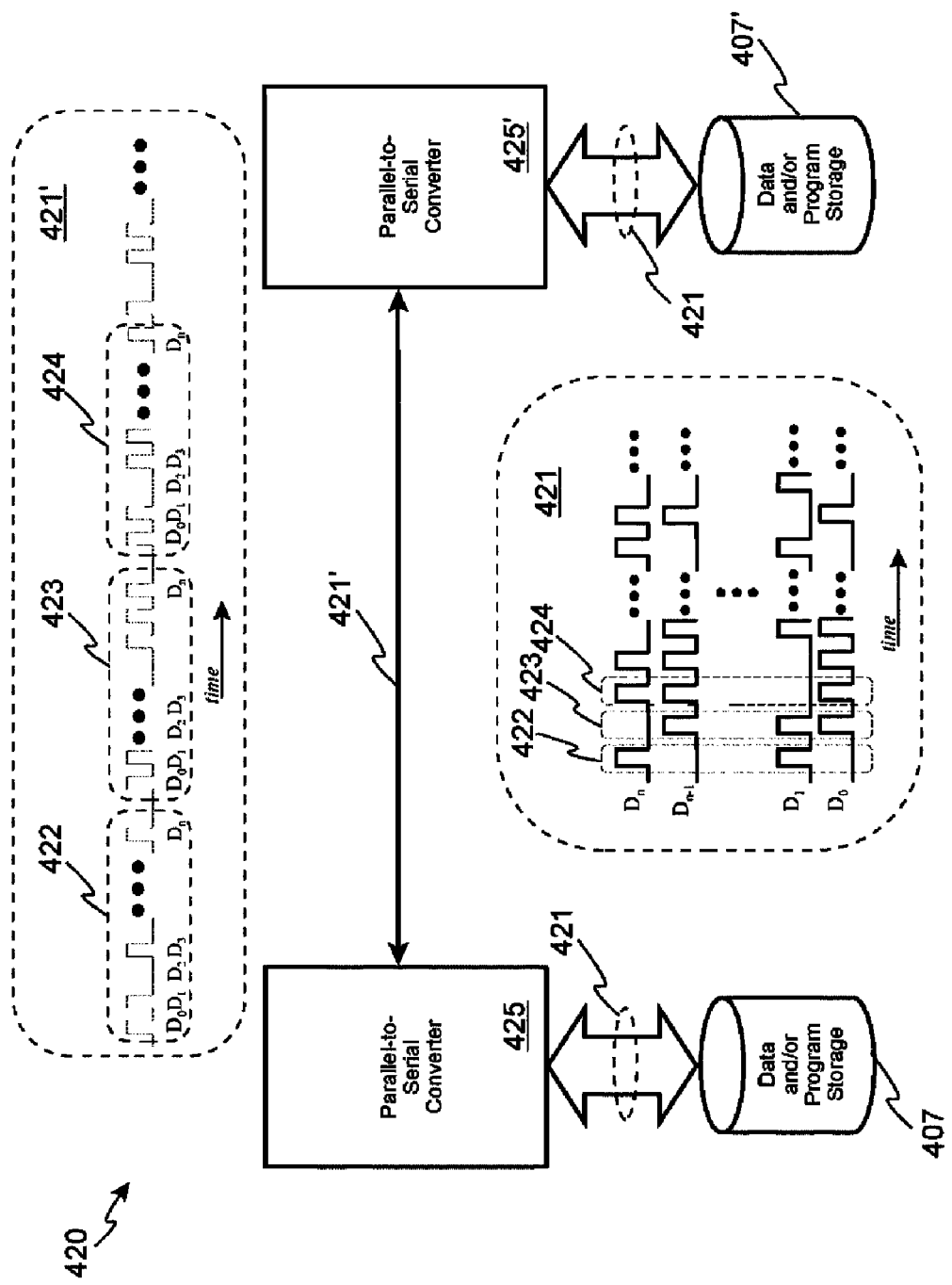

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$ being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

General Arrangements of Virtual Worlds

Figure 5:
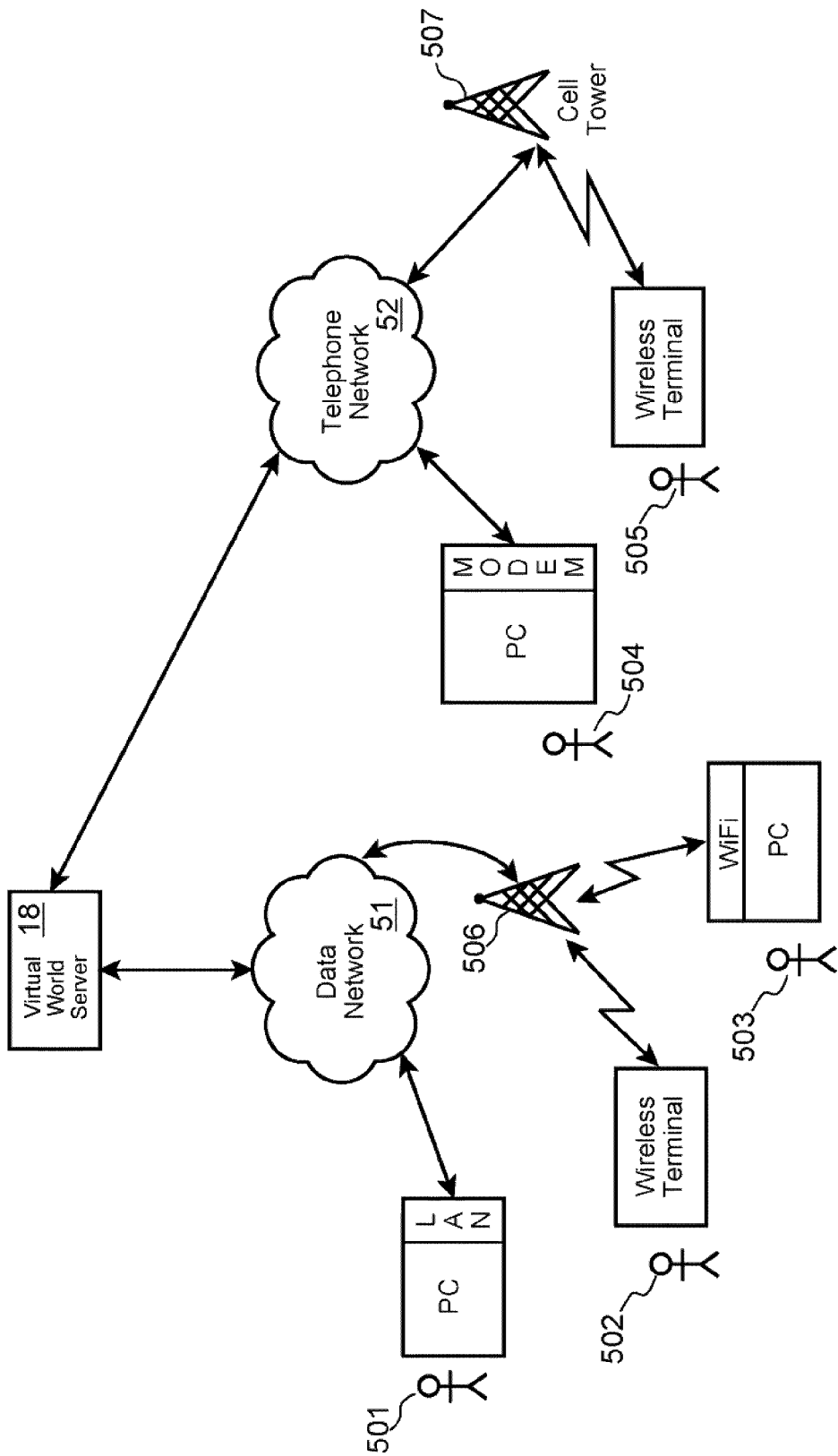
FIG. 5 illustrates arrangements of systems and networks used in order to interact with a virtual world server.

Turning to FIG. 5, a general arrangement of components, networks, and users of a virtual world is shown. A virtual world server (18) is interconnected through a data network (51), such as the Internet or an intranet, or a telephone network (52), such as a public switched telephone network ("PSTN") or a digital telephone network (e.g. digital cellular, Integrated Services Digital Network, Digital Subscriber Line, etc.). Many virtual world server's are interconnected to a combination or data and telephone networks, whereas the convergence of the two types of networks have rendered some networks difficult to clearly distinguish as exclusively data or telephone. For example, Voice over Internet ("VoIP") protocol has allowed telephone calls to be carried by traditionally data-only networks. And, Modulate-Demodulate ("modem") devices have long since allowed data communications over telephone lines. Further, traditionally content oriented networks, such as cable television networks, have also been adapted to carry digitized telephone calls and data connections to the Internet.

Of particular popularity in recent years are various types of wireless networks, from cellular telephone networks, to shorter range networks, such as "WiFi" and Blue Tooth networks, some of which use "towers" (507) and others of which use wireless access points (506) to interconnect a wireless device to a wired network.

In the arrangement of FIG. 5, users (501-505) access the Virtual World server (18) though the various networks (51, 52) using terminal devices such as a personal computer ("PC") with a local area network ("LAN") interface, a wireless terminal such as a cellular telephone or "WiFi" equipped laptop PC, or even a PC with a telephone or cable modem.

Major Functions of a Virtual World Server

Figure 6:
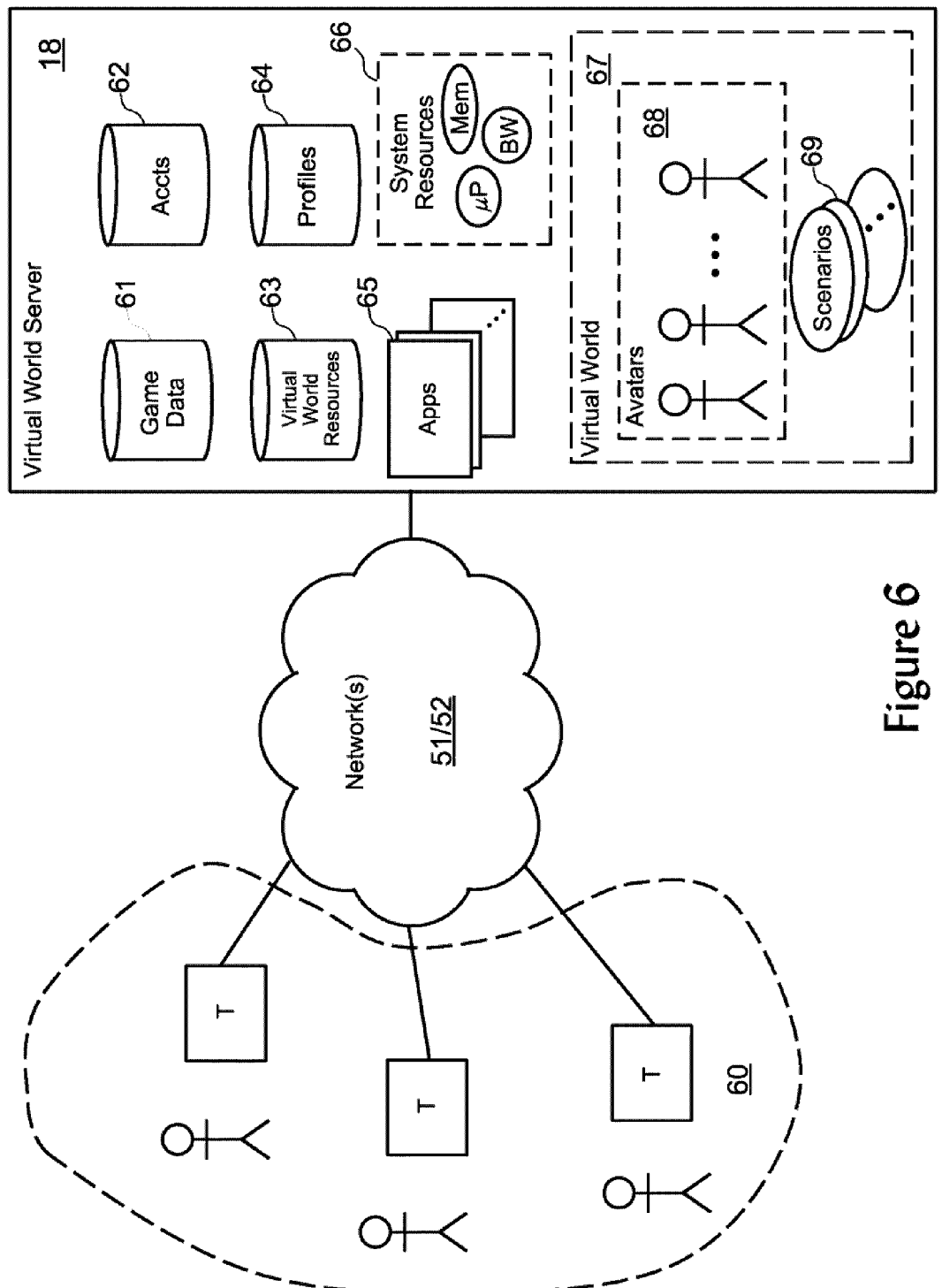
FIG. 6 provides additional information regarding primary components or functional sub-systems of a virtual world server.

FIG. 6 shows some of the major or primary functions of a Virtual World server (18) which is interconnected to one or more user's via their terminals (60) through one or more networks (51, 52). This depiction is a generalization of a virtual world environment, whereas specific virtual world platforms are, to date, typically proprietary in nature. As such, FIG. 6 is presented for reference only, and for the ease of understanding the present invention. It is within the skill of those in the art to adapt, configure, and implement the invention, as described herein, within a specific, proprietary virtual world environment.

Within the Virtual World server (18), there are a number of application programs (65) running, which utilize or game data (61), Virtual World resources (63), user account information (62) and profile (64). Such application programs, and extensions thereto, are often provided or developed in programming languages such as C or Python.

The Virtual World server (18) has integrated into it one or more microprocessors, memory devices and sub-systems, and communications bandwidth or capabilities (66).

Most virtual world servers can maintain and operate more than one "virtual worlds" simultaneously (67). In each of the virtual world's scenarios or sub-worlds (69), user's can use a different or the same avatars (68) to represent themselves.

Underlying Mechanisms of Interaction

Figure 7:
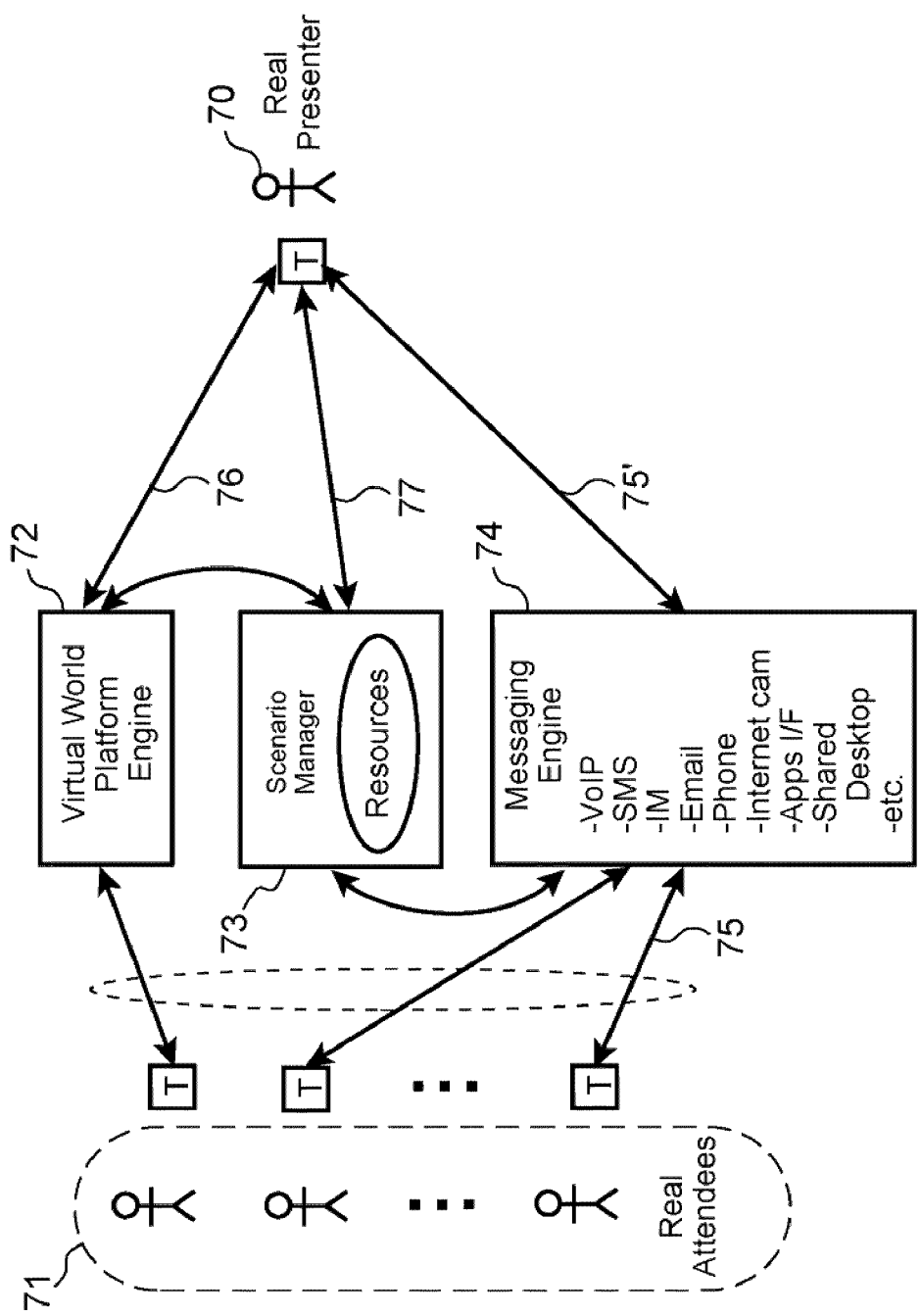
FIG. 7 depicts interactions between various types of users and major functional portions of a virtual world server.

FIG. 7 illustrates a generalized arrangement of a virtual world system which allows the users to interact with each other and with the scenarios created by and maintained by the Virtual World server. This depiction is a generalization of a virtual world interaction scheme, whereas specific virtual world platforms are, to date, typically proprietary in nature. As such, FIG. 7 is presented for reference only, and for the ease of understanding the present invention. It is within the skill of those in the art to adapt, configure, and implement the invention, as described herein, within a specific, proprietary virtual world environment.

In many scenarios, the users are divided into two or more classes of user, such as a presenter (70) and attendees (71). Each class of user may have greater or fewer capabilities within the world, such as a presenter being allowed to share a desktop presentation file with the attendees, but the attendees not being able to share their own desktop applications with other attendees.

In such an arrangement, the primary method of interaction between users and the applications of the Virtual World server is through a variety of messaging capabilities (34), such as VoIP, text messaging ("SMS"), instant messaging (e.g. America Online's Instant Messenger or Lotus' SameTime), electronic mail, telephone audio, internet camera audio/video, application programming interfaces ("API"), shared desktop technologies, and the like.

For example, during a Virtual World conference or presentation, the real presenter (70) may communicate (75, 75') with the real attendees (71) via their virtual presences (e.g. avatars) of the virtual scenario. Further, the real presenter (70) may also communicate (77) with a scenario manager portion (73) of the Virtual World server to accomplish such functions as reserving resources necessary to create and maintain the virtual scenario, freezing the scenario, and controlling attendance to the scenario. The real presenter may also communicate (76) with portions of the Virtual World "engine" (72) to accomplish other administrative functions, as may be necessary.

Illustrative Virtual Scenario

Many virtual worlds provide a three-dimensional visual simulation of each sub-world or scenario, accompanied by appropriate text and/or audio, in order to provide a believable, but not necessarily "realistic", rendering of the scenario to the users. For example, in "fantasy" scenarios, avatars of users may be animals, hypothetical creatures, etc., and the landscape of the scenario may be another plant or a future civilization.

However, in many business-to-business scenarios, such as corporate meetings or training sessions, the scenarios are more realistic in their appearance, albeit still virtual.

Turning to FIG. 8, an example depiction of such a realistic scenario is provided, in which the avatar (81') for the real meeting facilitator is shown along side a virtual presentation screen (82) as if the facilitator were in a real meeting room with walls (83, 84, 85), and a floor area where the avatars (81') of the meeting attendees are shown.

To enhance the experience, the virtual presentation screen may show a portion of the facilitator's actual terminal device's screen, such as a portion of a Microsoft Windows™ desktop interface, or may be filled with information provided to the Virtual World server from an application program, such as a mobile phone or PDA-based presentation program. Still further to enhance the virtual conference experience, the virtual walls are decorated according to the presenter's (or other administrator's) preferences, including coverings, skins, or lighting (88), and/or one or more company logos (84).

In such a scenario, the presenter or administrator of the virtual conference schedules, reserves, or otherwise configures these environment choices, including possibly restrictions as to which other users may be attendees. Such scheduling and reservation activities are usually performed in advance, and may need to be revised as the number of virtual attendees becomes more and more certain closer to time of the virtual conference.

For the purposes of this disclosure, the term "scheduling" of virtual world "resources" will be used to refer to such activities as requesting in advance, configuring, enabling, disabling, limiting, enumerating, revising, or otherwise controlling virtual environment characteristics, attendee lists, attendee capabilities, etc.

Problem Recognized by the Inventors

The present invention solves a problem not recognized by those in the art in which multiple virtual world platforms and systems have evolved and been deployed, none of which being capable of interacting with each other. In many ways, it could be said that today's virtual worlds are "islands" to themselves due to their technical limitations (e.g. proprietary design natures), and due in part to their previous market appeal (e.g. only to their own client or user base).

Regions in a VU are independent of each other from an infrastructure perspective. For example, in Second Life, regions are often run on a single core of a 2-CPU, 2-core Linux system (so each computer can run four simulators). When the simulator software starts up, it joins a pool of similarly-configured systems waiting to be assigned a region to run. When a new region is created, its configuration (land layout, water layout, textures, etcetera) is stored in a database, and then randomly assigned to one of the spare simulators in the pool.

In the near future, it is expected that it will become more common to have different service providers for VU grid software. Recently, Linden Lab open-sourced its client software that they use for Second Life, making this possibility much more likely. One problem with running VU grids with different service providers is that currently, no connection exists to the central asset server or login servers. The asset server contains each avatar's inventory, and all the objects, scripts and textures used in-world. This database may be strained with a large number of users (such as 18,000+ for Second Life).

The inventors have recognized a problem which is expected to arise in the near future when VU users desire to merge or split VUs for different service providers and "sim-in-a-box" VUs. Merges and splits will be desired for a number of reasons. For example, a corporate divestiture of a business unit or need to restructure VUs along organizational lines, resulting in IT system division; or a desire to split to decrease the total population of the VU (such as if degrading performance or experiential clutter had been reported), may drive a need for a VU split.

In the near future, as companies that oversee virtual universes split and merge (e.g. consolidate and undergo financial buy-outs), a need for accomplishing such splitting and merging becomes apparent. The inventors have recognized that it will become more common to have different service providers for VU grid software. Recently Linden Lab open-sourced its client software that they use for Second Life, making this possibility much more likely.

Recently, Linden Labs demonstrated a "sim-in-a-box." It contains all the hardware and software needed to run a single, stand-alone region, but with no connections to the current Asset or Login server connections. With this, every user logging in would have to create a new account again for this stand-alone VU, and everyone would start with "no inventory," that is, having to rebuild their avatar's inventory from scratch. One problem with running VU grids with different service providers is that currently, no connection exists to the central asset server or login servers. The asset server contains each avatar's inventory, and all the objects, scripts and textures used in-world. This database may be strained with a large number of users (such as 18,000+ for Second Life).

Overview of the Solution and Approach

Figure 1:
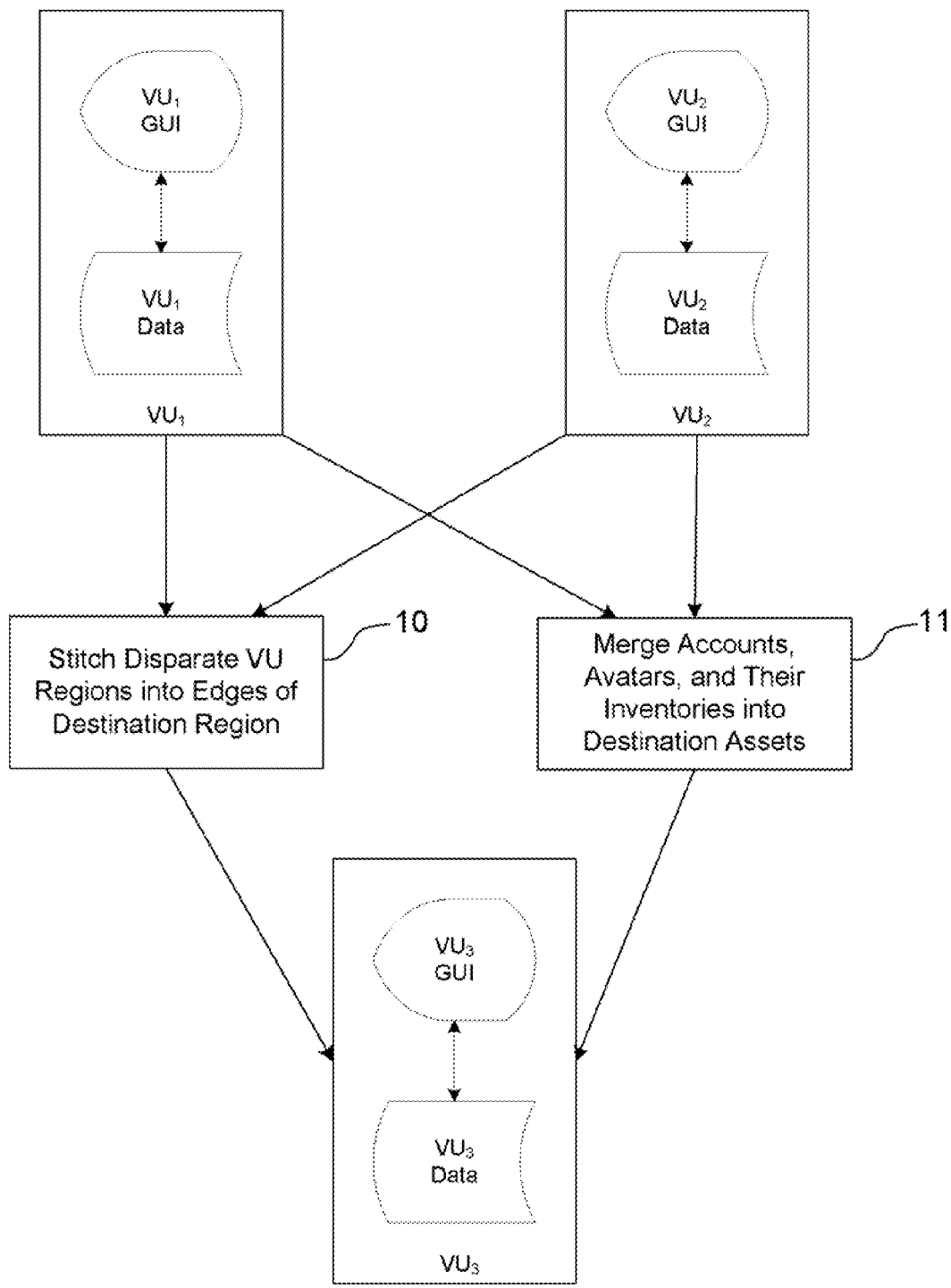
FIG. 1 sets forth high level phases of processes according to the present invention.

As shown in FIG. 1, two generalized phases to merge disparate and independent VUs according to the present invention, are as follows:

1. merge regions by stitching into selected destination region edges (10); and
2. merge accounts, avatars, and their inventory (11).

In this context, the term "disparate VU" is used to describe virtual universes which are not associated together by shared software or hardware components, and most commonly are executed or hosted on separate "cores" of a computing platform. Further, the term "stitching" refers to a three-dimensional ("3-D") geometrical merging of VU regions, as would be accomplished by bringing together regions of land in a seamless fashion. There are several known products and tools to accomplish the graphical task of stitching 3-D geometries, such as Panoweaver and RasterStitch. Through an application programming interface ("API") to such a product, the present invention may accomplish the task of stitching the graphic elements of two or more VUs together into a destination VU.

While the following steps and descriptions herein reference regions within a same VU grid, it is possible to implement these steps across separate VU grids, provided the VU engine is identical or there exists a translation service of all the objects.

Implementation and Logical Processes

The following paragraphs are suitable for implementation as software executed by computers (e.g. servers, clients, or both), circuitry coupled with electronic devices, or a combination of software and circuitry.

While the examples provided herein will refer to Linden Labs' SecondLife™, it is within the skill in the art to adapt the invention to realize it in conjunction with a wide variety of virtual world systems, including but not limited to Sony's Everquest™, Terra ICT's Dreamville™, Dubit Limited's Dubit™, Voltweb Limited's TowerChat™, Lightmaker's Virtual Ibiza™, Bongartz Dr Kozan GbR's Moove™, Sulake Corporation Oy's Habbo Hotel, Playdo's Playdo™, Siliconmania's "Whyrobbierocks<dot>com"™, Voodoo Chat, Adobe's Atmosphere™, Daimler Chrysler's MobileKids, Blizzard's World of Warcraft™, America's Army, Forterra Systems' products, Tate's agoraXchange™, Activeworlds, Coca Cola's Coke Studios™, Integrated Virtual Networks' Cybertown™, Walt Disney Internet Group's Toontown™, Disney Online's Virtual Magic Kingdom™, MadWolf Software's "The Manor"™, Muse Communications' "Muse"™, Electronic Arts' Sims Online™, Tomo Software's Sora City™, There Incorporated's "There"™, The Digital Space Commons' Traveler™, Halsoft's VPchat™, Stratagem Corporation's VZones™, Numedeon's Whyville™, Worlds<dot>com™, and Three Rings' "Yohoho! Puzzle Pirates"™.

These methods require a modification to VU grid software where a new migration tool will be created and operate according to the steps below. This migration tool may need to have connectivity and administrator access to the VU grid to be split, and in particular have read-write access to the VU's databases, depending on details of the design of the VU to which the invention is being coupled. This tool will act as a bridge where migration transactions can be initiated and confirmed.

For reference, in the following details, the inventors talk about merging VU grid 2 into VU grid 1. These methods may be performed when VU grid 1 is functioning or when it is offline. If the grid migration is performed while a region is on-line, there may be some period of time when an avatar from VU grid 1 will have its region and land unavailable (or partially available) while it is placed into VU grid 2. The inventors also describe the method in a preferred embodiment, which would be able to merge VUs without suspending service.

For greater understanding of the invention, two methods or approaches are now described.

Method 1: "Merge regions by stitching into selected destination region edges". This method describes how to technically combine regions (land, buildings, and environment objects). This method is preferably implemented from the migration tool.

Figure 9A:
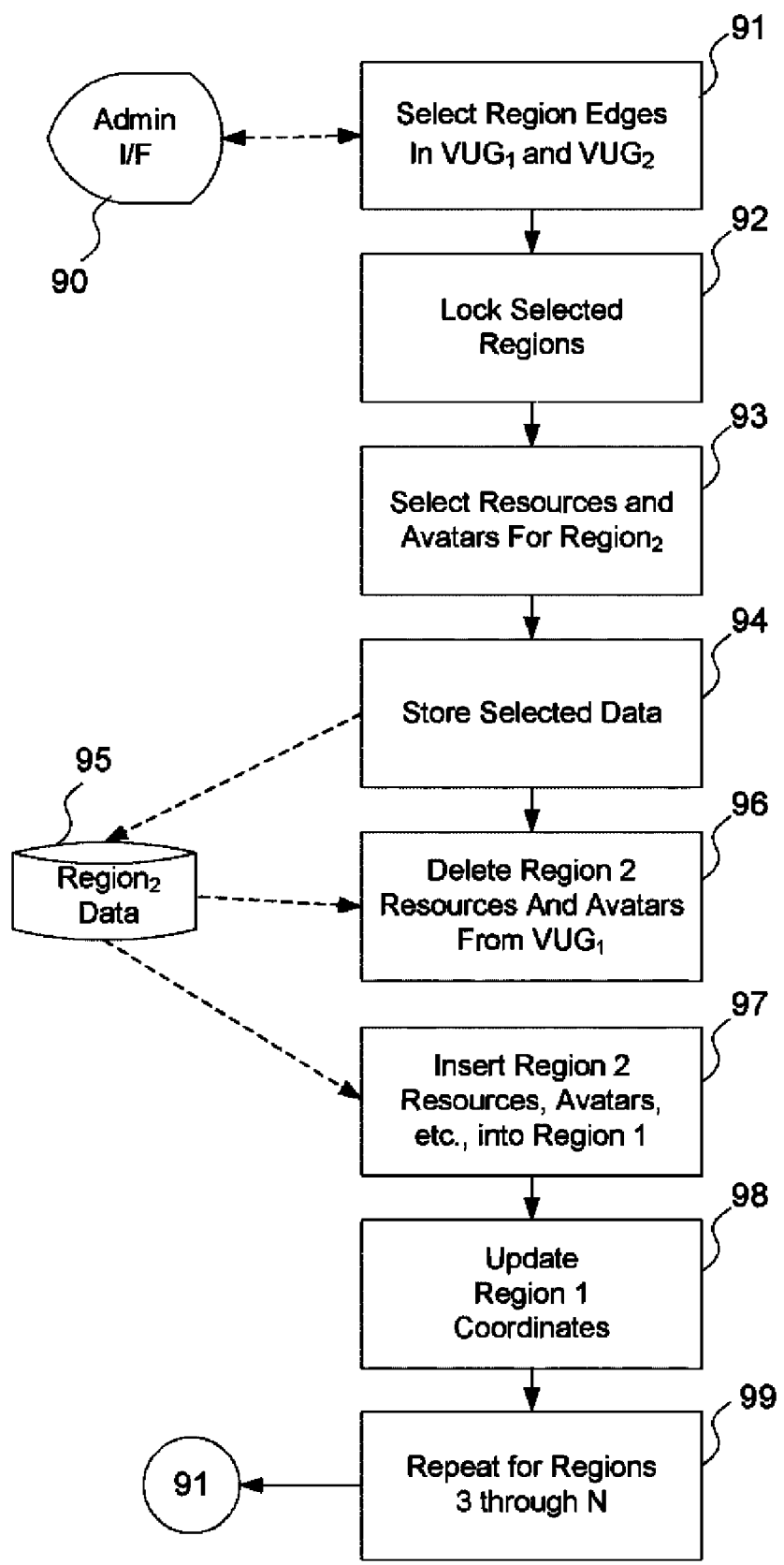
FIGS. 9*a* and 9*b* set forth detailed logical processes according to the present invention.

Referring now to FIG. 9a, an administrator using an control interface (90) or an automated program selects (91) region edges from VU grid 2 and VU grid 1 that will be stitched. That is, the coordinate lines at which an avatar traveling from, for example, VU grid 1 region 1 will travel into former VU grid 2 region 1. This is preferably accomplished via a drag-and-drop graphical representation of the regions, as downloaded and rendered in map form by the migration tool, although other implementations are likewise possible. In one embodiment, the owner of a selected region in grid 2 optionally specifies general characteristics of where he would prefer to have land stitched, and the stitching software can attempt to find a best match. This may change the final layout characteristics of the grid 2 world (e.g. the original grid 2 may be scrambled somewhat when it is stitched), but this may be okay in some embodiments.

Optionally, the stitching system can look for a best match for stitching for the entire grid 2 and then perform an automated stitching. For example, the stitching software may attempt to minimize the landscape interpolation required in cases of mismatch of high elevation and low elevation regions. It may attempt to minimize the interpolation required in terms of color interpolation. Thus, region 2 may be translated back and forth until a minimum required overall interpolation is reached.

Other factors may be considered such as minimizing the conceptual interpolation required for stitching city regions and country regions, which may be tagged as such regions before attempted merger. Available technology for 3-D interpolation of surfaces represented by 3-D meshes may be incorporated and used for this task.

Next, the system according to the invention sends instructions to VU grid 2 to lock (92) the selected region to be merged so that no new avatars may enter and no modification may be made. The locking preferably teleports rather than disconnects any avatars who are in the region at the time of the lock.

Subsequently, the system according to the invention sends instruction to Vu grid 2 to retrieve (93) all of the selected region's data and resources. The data retrieved in the previous step is stored (94) into a temporary table (95).

The system according to the invention sends a delete query (96) to VU grid 2 to delete the data selected in the previous step, and sends an insert query (97) to VU grid 1 using the VU grid 2 data from the temporary table (95).

Finally, the system according to the invention sends an update query (98) to VU grid 1 to update the coordinates to stitch the regions according to the coordinates specified by the administrator or automated program (91).

The foregoing steps are then repeated (99) until all regions have been merged, keeping in mind that it is also possible to merge two VWs at a single intersecting line, in which case this method is invoked a single time.

Figure 9B:
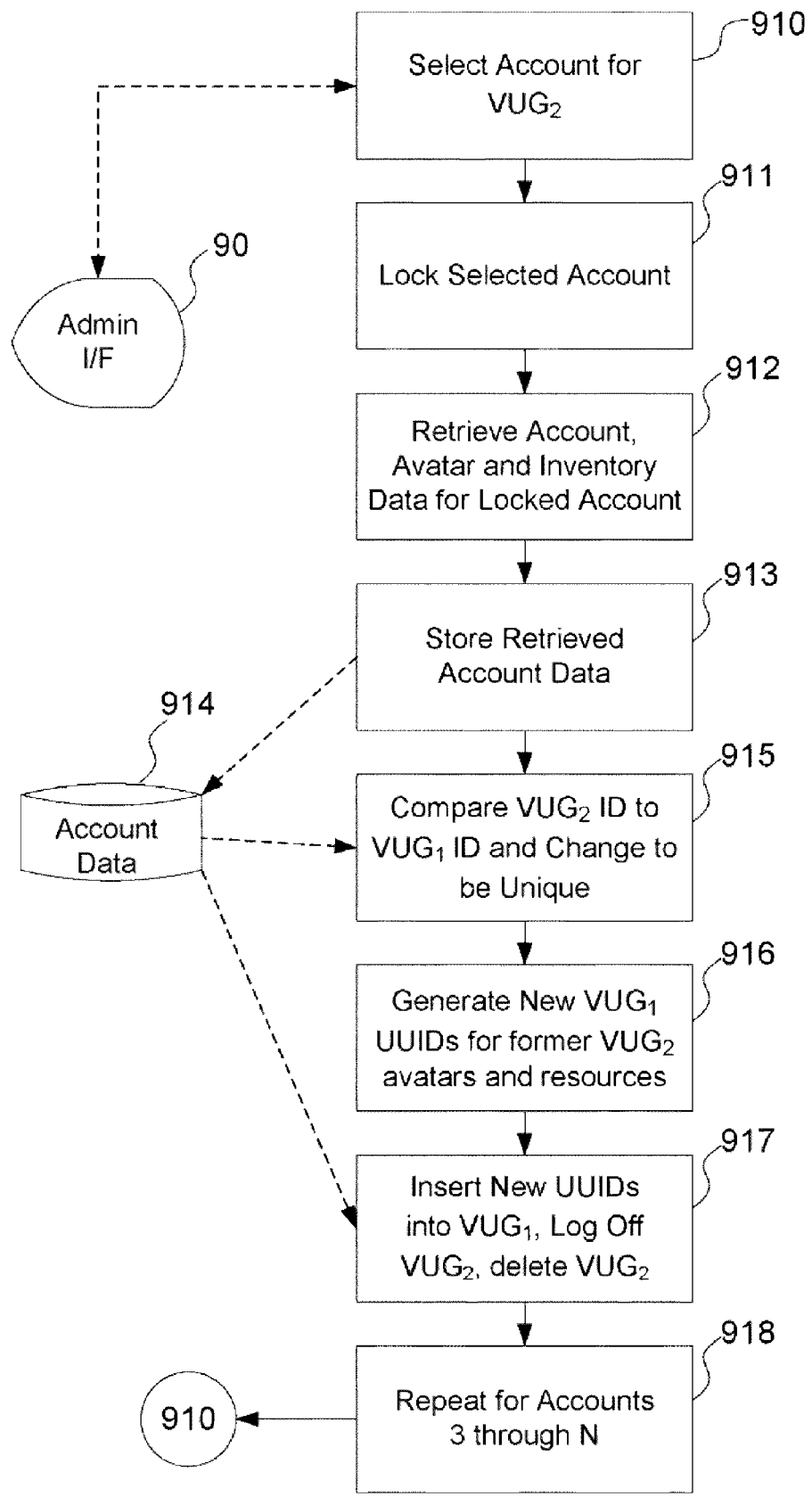

Method 2: Merge accounts, avatars, and their inventories. Another method according to the invention, which may be used independently or in combination with Method 1, merges user accounts, their associated avatars, and their inventories items into a disparate VU grid. Referring now to FIG. 9*b*, another method and process according to the present invention includes steps as follows.

Initially, a system according to the invention sends instructions (911) to VU grid 2 to lock selected (90, 910) user account(s) so that no avatar or inventory modifications may be made. The locking preferably includes or is preceded by notification to the users of the selected accounts.

Next, a system according to the invention sends a select query (912) to VU grid 2 to retrieve all of the account, avatar, and inventory data for the selected account. This preferably includes any related data such as history and scripts. The data retrieved in the previous step is stored (913) into a temporary table (914).

Subsequently, a system according to the invention compares (915) universe user account identifications ("UUID") for the selected account to the user account UUIDs for the destination VU grid 1. For each duplicate UUID found, the system changes the account UUID based on any desired logic until all account UUIDs are unique, such as by appending a numeric sequence at the end of an account from VU grid 1 or 2 until it becomes unique, prompting the user for a new UUID, notifying the user of the UUID change, assigning a temporary user UUID, etc. Some of these options may involve communication to the user of the new or temporary account ID, such as via an automated message sent to their VU client window, email address on record, or any other contact means.

After UUID uniqueness issues have been resolved, a system according to the invention generates (916) new UUIDs for all former VU grid 2 objects (avatars and all inventory items) using VU grid 1's UUID generation routine.

Now, a system according to the invention sends an insert query (917) to VU grid 1 using the VU grid 2 data from the temporary table. Optionally, a system according to the invention sends instructions to VU grid 1 to invoke any generation routines normally invoked upon user or inventory creation, such as updating notice boards, web site statistics, etc. Then, finally, an instruction is sent to VU grid 2 to log-off the moved user account(s) who are currently logged in to VU grid 2.

Optionally, an avatar transfer service may be invoked to automatically log the moved users on to the merged VU grid 1. And, a delete query is sent to VU grid 2 to delete the user data and all descendent objects such as avatars, inventory, history, scripts, etc., including any necessary instructions to VU grid 2 to invoke any routines normally invoked upon account deletion. In some embodiments, this step (917) may also include inserting into a temporary table on VU grid 2 the account IDs with their passwords that have been deleted, and then providing instructions regarding the move to any user attempting to re-login to VU grid 2 using one of these ID/password combinations. This table may be purged at a desired time.

If more accounts are to be moved into the destination VUG, then steps 910-917 are repeated (918) for each account to be moved into the destination VU grid.

Other Methods and Variations. The methods described above may be ordered differently, and steps may not be committed in the databases until other or all steps have been completed. Such variations will be recognized by those skilled in the art as failing within the scope and framework of the present invention.

Usage Example Scenarios

As mentioned in the foregoing paragraphs, the two methods according to the invention may be realized or utilized independently, or in combination with each other. For example, in the following scenarios, the first method would be useful:

(1) VU grid 2 owner would like to pay VU grid 1 owner for use of their regions and layout to be integrated into VU grid 2, but VU grid 1 owner is unwilling to sell VU grid 1's user accounts, or VU grid 2 owner is unwilling to pay money for VU grid 1's user accounts. Note that in this case, the steps to delete the original regions would be skipped.

(2) VU grid 1 owner would like to merge VU grid 1's regions into a new VU grid 2, but of course the accounts cannot be merged over because in this case the VU grid 1 is to remain operational. Note that in this case, the steps to delete the original regions would be skipped.

In the following scenarios, the second method would be useful:

(1) The reason for a merger is purely to increase population density, and so merging regions would not be desired. The regions from one VU grid are to be abandoned.

(2) VU grid 2 needs to send its population to VU grid 1 to make room for new users who have no history with the VU grid provider.

CONCLUSION

While certain examples and details of a preferred embodiment have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. An automated method comprising:

selecting, using a computer system, one or more region edges from each of a first virtual universe region and a second virtual universe region, wherein the first virtual universe region is disparate from the second virtual universe region, and are not associated together by shared software or hardware components;

instructing, by the computer system, a source virtual universe grid to lock the first virtual universe region to form a first locked virtual universe region corresponding to at least one edge among selected one or more region edges, said lock preventing avatars entering or exiting the first locked virtual universe region and preventing changes to resources in the first locked virtual universe region;

retrieving, from the source virtual universe grid, data and resource information for the first locked virtual universe region;

storing the data and resource information retrieved from the source virtual universe grid in a temporary table;

sending a delete query to the source virtual universe grid to delete the data and resource information in the source virtual universe grid;

sending an insert query to a destination virtual universe grid that contains the second virtual universe region, wherein the insert query includes the data and resource information stored in the temporary table; and stitching, by the computer system, the first virtual universe region to the second virtual universe region in the destination virtual universe grid, wherein the stitching is a three-dimensional geometric merging of the first virtual universe region to the second virtual universe region along the at least one edge.

2. The method as set forth in claim 1 further comprising repeating said steps of selecting, instructing, retrieving, storing, deleting, inserting, and stitching updating for a plurality of source virtual universe grids and one or more destination virtual universe grids.

3. The method as set forth in claim 1 wherein the one or more region edges comprise one or more coordinate lines forming a boundary between said source virtual universe grid and said destination virtual universe grid.

4. The method as set forth in claim 1 wherein the selection of the one or more region edges is performed by automatic comparison of said source virtual universe grid and said destination virtual universe grid to determine an optimal match boundary.

5. The method as set forth in claim 4 wherein said optimal match boundary is determined using minimization of landscape interpolation.

6. The method as set forth in claim 1 wherein said lock comprises teleporting any avatars that are in said first virtual universe region, in response to instructing a source virtual universe grid to lock the first virtual universe region.

7. A computer system for merging disparate virtual universe regions, the computer system comprising:

one or more processors, one or more computer-readable memories and one or more computer-readable, tangible storage devices;

program instructions, stored on at least one of the one or more storage devices for execution by at least one of the one or more processors via at least one of the one or more memories, to select one or more region edges from each of a first virtual universe region and a second virtual universe region, wherein the first virtual universe region is disparate from the second virtual universe region, and are not associated together by shared software or hardware components;

program instructions, stored on at least one of the one or more storage devices for execution by at least one of the one or more processors via at least one of the one or more memories, to instruct a source virtual universe grid to lock the first virtual universe region to form a first locked virtual universe region corresponding to at least one edge among selected one or more region edges, said lock preventing avatars entering or exiting the first locked virtual universe region and preventing changes to resources in the first locked virtual universe region;

program instructions, stored on at least one of the one or more storage devices for execution by at least one of the one or more processors via at least one of the one or more memories, to retrieve, from the source virtual universe gird, data and resource information for the first locked virtual universe region;

program instructions, stored on at least one of the one or more storage devices for execution by at least one of the one or more processors via at least one of the one or more memories, to store the data and resource information retrieved from the source virtual universe grid in a temporary table;

program instructions, stored on at least one of the one or more storage devices for execution by at least one of the one or more processors via at least one of the one or more memories, to send a delete query to the source virtual universe grid to delete the data and resource information in the source virtual universe grid;

program instructions, stored on at least one of the one or more storage devices for execution by at least one of the one or more processors via at least one of the one or more memories, to send an insert query to a destination virtual universe grid that contains the second virtual universe region, wherein the insert query includes the data and resource information stored in the temporary table; and program instructions, stored on at least one of the one or more storage devices for execution by at least one of the one or more processors via at least one of the one or more memories, to stitch the first virtual universe region to the second virtual universe region in the destination virtual universe grid, wherein the stitching is a three-dimensional geometric merging of the first virtual universe region to the second virtual universe region along the at least one edge.

8. The computer system of claim 7, wherein the one or more region edges comprise one or more coordinate lines forming a boundary between the source virtual universe grid and the destination virtual universe grid, and the selection of the one or more region edges is performed by automatic comparison of the source virtual universe grid and the destination virtual universe grid to determine a match boundary.

9. A data processing system comprising:

a bus;

a storage device connected to the bus, wherein computer usable code is located in the storage device;

a communication unit connected to the bus; and a processing unit connected to the bus, wherein the processing unit executes the computer usable code for merging disparate virtual universe regions; the processing unit further executes the computer usable code to:

select one or more region edges from each of a first virtual universe region and a second virtual universe region, wherein the first virtual universe region is disparate from the second virtual universe region, and are not associated together by shared software or hardware components;

instruct a source virtual universe grid to lock a first virtual universe region to form a first locked virtual universe region corresponding to at least one edge among selected one or more region edges, the lock preventing avatars entering or exiting the first locked virtual universe region and preventing changes to resources in the first locked virtual universe region;

retrieve, from the source virtual universe gird, data and resource information for the first locked virtual universe region;

store the data and resource information retrieved from the source virtual universe grid in a temporary table;

send a delete query to the source virtual universe grid to delete the data and resource information in the source virtual universe grid;

send an insert query to a destination virtual universe grid that contains the second virtual universe region, wherein the insert query includes the data and resource information stored in the temporary table; and stitch the first virtual universe region to the second virtual universe region in the destination virtual universe grid, wherein the stitching is a three-dimensional geometric merging of the first virtual universe region to the second virtual universe region along the at least one edge.

10. The data processing system of claim 9, wherein the processing unit further executes the computer usable code to teleport any avatars that are in the first locked virtual universe region, in response to instructing a source virtual universe grid to lock the first virtual universe region.

* * * * *